Aug. 4, 1953 W. C. STEWART 2,647,393
RELAXATION TEST APPARATUS
Filed March 30, 1949 4 Sheets-Sheet 1
FIG.1.
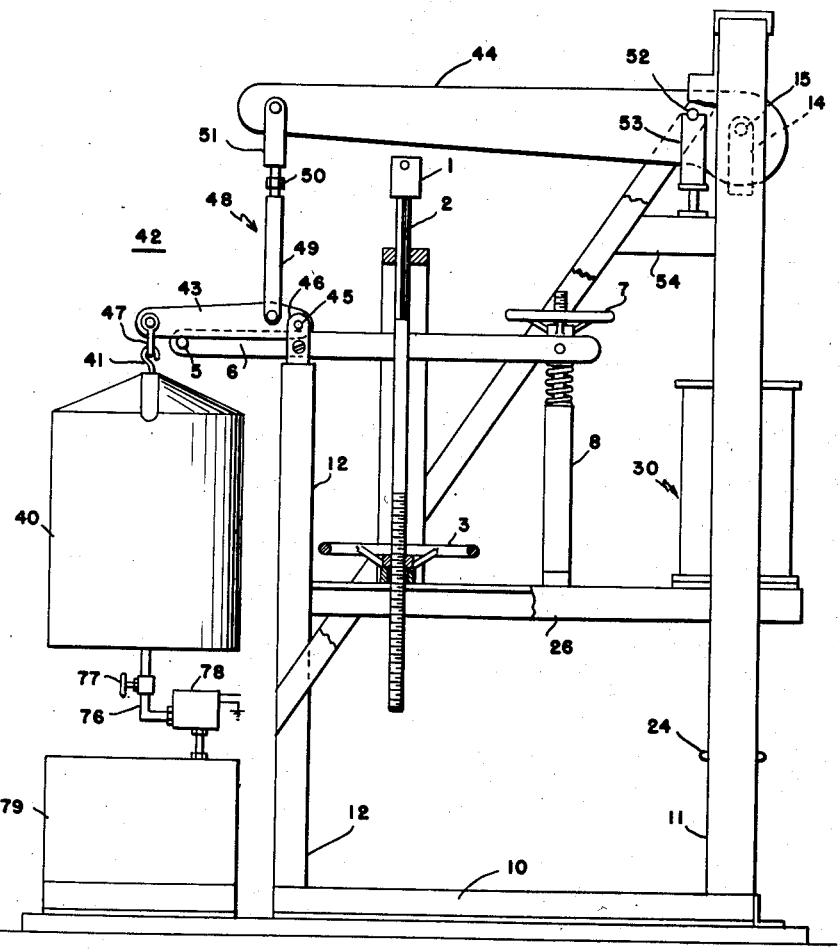
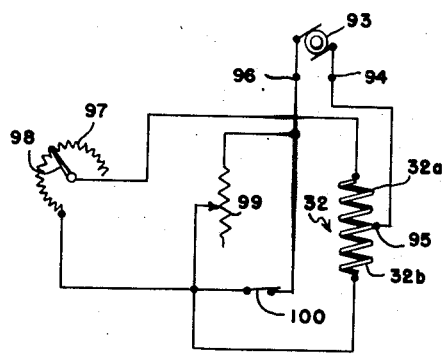
FIG.6.
INVENTOR.
William C. Stewart
BY
ATTORNEY Aug. 4, 1953 W. C. STEWART 2,647,393
RELAXATION TEST APPARATUS
Filed March 30, 1949 4 Sheets-Sheet 2

INVENTOR.
William C. Stewart
BY
ATTORNEY

Aug. 4, 1953 W. C. STEWART 2,647,393
RELAXATION TEST APPARATUS
Filed March 30, 1949 4 Sheets-Sheet 3

INVENTOR.
William C. Stewart
BY
ATTORNEY

Aug. 4, 1953  W. C. STEWART  2,647,393
RELAXATION TEST APPARATUS
Filed March 30, 1949  4 Sheets-Sheet 4
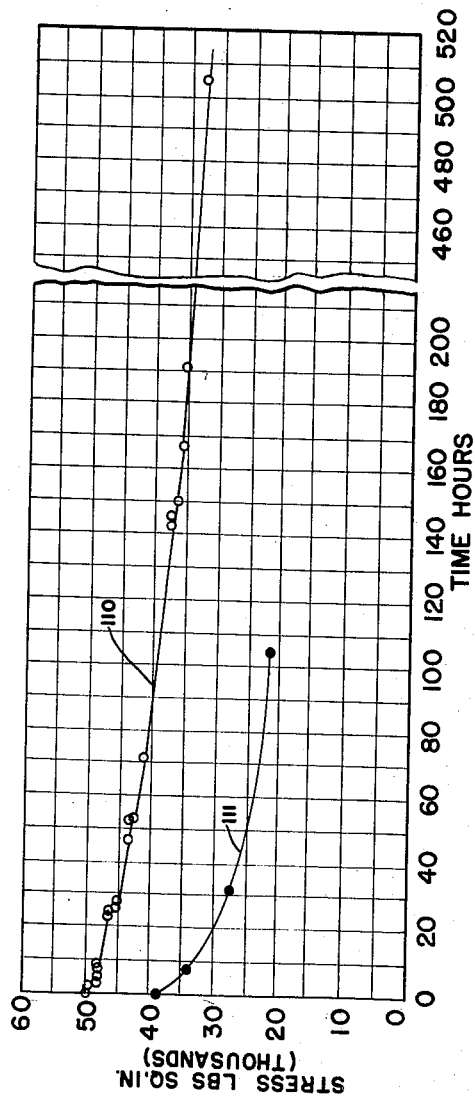
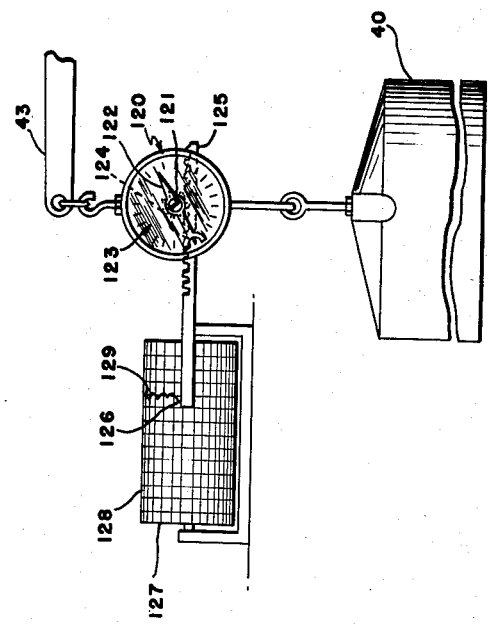
INVENTOR.
William C. Stewart
BY
ATTORNEY Patented Aug. 4, 1953

2,647,393

UNITED STATES PATENT OFFICE 2,647,393

RELAXATION TEST APPARATUS

William C. Stewart, Severna Park, Md.

Application March 30, 1949, Serial No. 84,442

3 Claims. (Cl. 73—15.6)

(Granted under Title 35, U. S. Code (1952), sec. 266)

The invention described herein may be manufactured and used by or for the Government of the United States of America for governmental purposes without the payment of any royalties thereon or therefor.

This invention relates to relaxation test apparatus with particular application of such apparatus to metal bolting.

On assembled structures, such as of the bolted type, there exists a considerable state of strain due to the elasticity of the structure and this strain is particularly apparent in the bolts themselves. As a result at elevated temperatures creepage or slow elongation of the bolts results so that in time the original rigidity of the structure is deleteriously modified.

To overcome this difficulty apparatus has previously been employed for measuring elongation of the structure or bolt metal as a function of time at constant temperature using a constant stress, so that appropriate allowance may be made for this elongation. This procedure is subject to the disadvantage that if the parts are adjusted for elongation, with repeated elongation strain hardening and consequent maladjustment occur.

Particularly in bolted structures, relaxation adjustments of stress are more satisfactory in that the stress condition is determined at which no elongation occurs. This is a constant stress and hence desirable for maintenance of a permanent state of rigidity.

It is therefore an important object of the invention to provide a method and associated apparatus for determination of tension values below which creepage does not occur. An object also is the provision of improved apparatus for increasing the accuracy of determination of stress values below which elongation at a given temperature does not occur. Another object relates to the provision of improved control means for reducing progressively the stress applied to the test material during a test operation.

Other objects and many of the attendant advantages of this invention will be readily appreciated as the same becomes better understood by reference to the following detailed description when considered in connection with the accompanying drawings wherein:

Fig. 1 shows a side elevation of the relaxation test apparatus;

Fig. 6 is a diagram of the power circuit;

Fig. 7 is a graph showing the stress-time curves of the apparatus; and

Fig. 8 is a view of a type of recorder device usable with the apparatus.

Figure 2:
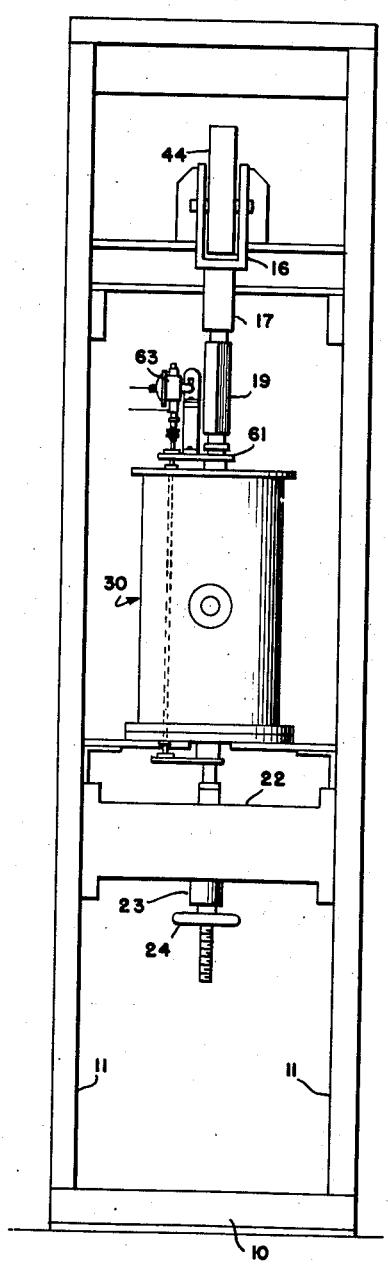
Fig. 2 is a front elevation of the test apparatus.

Reference is made to Fig. 1 for a showing of the various elements of the relaxation test apparatus. A base plate 10 underlies supporting standards 11 for the extensometer and furnace and 12 for the actuating weight and connection elements.

The extensometer 13 is vertically mounted between the two displaced standards 11. Adjacent the top of both of these standards a vertical slot 14 is formed which receives a pin 15 vertically reciprocable within the slots. To this pin a shackle 16 connects a link 17 and to the link is attached the upper adapter 18 through the turn buckle 19.

The adapter 18 (Fig. 3) is in the form of a short rod having an enlarged head with a screw threaded end opening to receive the test element 21. A similar lower adapter 20 is positioned in elongation of the upper adapter and the rod shaped test element 21 is supported therebetween. The lower end of the lower adapter has connections through a support beam 22 and attached thrust bearing 23 to the leveling wheel 24.

Figure 3:
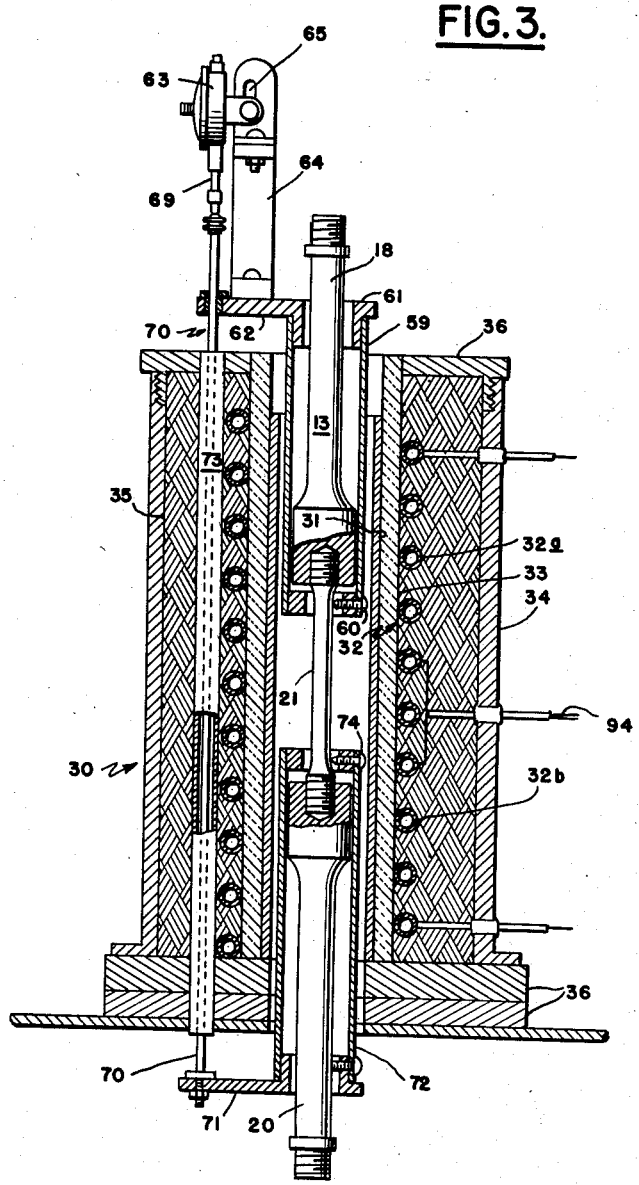
Fig. 3 is a sectional view of the extensometer.

A furnace 30 is provided for supplying heat to the test rod 21. This furnace is mounted on a cross beam between standards 11 and 12 and consists of an electric resistance unit having a tubular heating chamber adapted to enclose the test element. As shown in Fig. 3 the furnace comprises a steel tube 31 forming the heating chamber, a heating coil 32 used on a second refractory tube 33, and a jacket 34. Interposed between the coil and the jacket is a mass of crushed or fibrous refractory and insulating material 35 such as diatomaceous earth. Asbestos board 36 is placed at the ends of the furnace.

A liquid load is employed as the stress applied to the test element 21. This may be any suitable liquid, a preferred liquid being transformer oil since it flows readily, does not easily decompose and is not volatile at ordinary temperatures.

This liquid is placed in a receptacle or tank 40 provided with a supporting hook 41 and suspended in the compound lever system 42.

The lever system 42 utilizes two connected levers 43 and 44. Lever 43 is pivoted at one end at 45 on a cleft terminal element 46 extending from the upper end of standard 12. The other end of this lever couples the tank hook 41 with a clevis 47. At a selected intermediate point on the lever 43 a link 48, formed of the coupler 49, turn-buckle 50 and clevis 51, connects the lever arm 43 to the end of lever arm 44. The other end of lever 44 connects to the pin 15 of the extensometer 13, while leverage is secured by seating intermediate pin 52 on a U-support 53, mounted on a frame beam 54. The leverage action is apparent if pivot 45 is considered fixed. Hence a pull by load 40 exerts leverage on arm 44 to extend the extensometer against the anchor of the lever adapter 20 in cross beam 22.

Support means are provided for the lever beams 43 and 44 whereby, at will, the load of these elements may be removed from the extensometer 13. Beam 44 may be supported by a head 1 mounted on square rod 2 slidable in a squared guide opening of brace 4 with the base end of the rod threaded to engage a screw wheel 3. The support rod is mounted on cross beam 26. Rotation of screw wheel 3 moves the head into supporting engagement with beam 44.

Beam 43 may be supported by the end pin 5 of a lever arm 6 pivoted on end plate 46 of standard 12. The actuating end of this lever engages a screw wheel 7 which in turn, has threaded engagement with a support rod 8 fixed to the support beam 26. Rotation of the screw wheel 7 actuates lever 6 to move pin 5 into supporting engagement with the lever 43.

The mechanism by which the discharge of liquid is obtained from tank 40 at the creep impulse will now be described. Referring to Fig. 3 it will appear that the adapter 18 is enclosed by a refractory tube 59, such as one of "inconel" which is fixed at the lower end by any appropriate means, as by brazing, to the adapter head and to the test element 21 by annularly placed terminal set screws 60. The upper end of the tube 59 extends above the furnace unit and coil tube 33, terminating in a bracket element 61 having a bracket extension 62 serving as a support for the gage 63. For this purpose a support plate 64, having a vertical slot 65 adjacent its upper end, connects directly with the gage 63. The slot 65 permits vertical adjustment of the gage.

Figure 4:
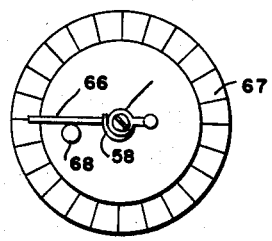
Fig. 4 is a detail of the dial contact device.

The gage is provided with a metal pivotally mounted spring actuated needle 66 (Fig. 4) and a graduated plate face 67 over which the needle has movement. A terminal contact 68 preferably a conductor as carbon, projects from the face in the path of needle movement, a spring 58 normally urging the needle against the contact so that for a given condition there is formed an electrical circuit to operate an electro-magnetic valve in the load tank exit tubing.

The gage needle is connected as by gearing with a vertically movable rod 69, the bottom end of which is adapted to contact detachably with the upper end of a rod 70. The rod 70 extends throughout the furnace length and at its bottom end is fixed to a bracket 71 attached to the bottom of a tube 72 which corresponds to tube 59 and protrudes from the furnace base beyond the end plates 36. Because of the requirements of bracket length of the tube 59 the rod 70 is positioned in a metal tube 73 in the furnace wall and extends parallel to the furnace axis throughout the furnace length. The rod 70 is preferably of low heat expansible material, such as "invar," to reduce any effect due to furnace heat on the rod length.

As mentioned above, the tube 72 corresponds to tube 59 and consists of "inconel" tubing attached at one end to the adapter 20, as by brazing, and to the test piece 21 as by set screws 74, and at the other and outwardly protruding end to the bracket 71.

At the base of the load tank 40 is an outlet pipe line 76 having a manual valve 77 and an electromagnetic valve unit 78. This pipe line leads to an overflow tank 79 for oil discharged from tank 40 through the magnetic valve as the result of creepage in the test piece 21. By controlling the valve so that it opens only on the creep movement of the test element the oil flow to the overflow tank becomes a measure of the excess load producing creepage. Hence by subtracting the creep induced load from the initial load the appropriate load for applying to the test element without development of creepage is determined.

Figure 5:
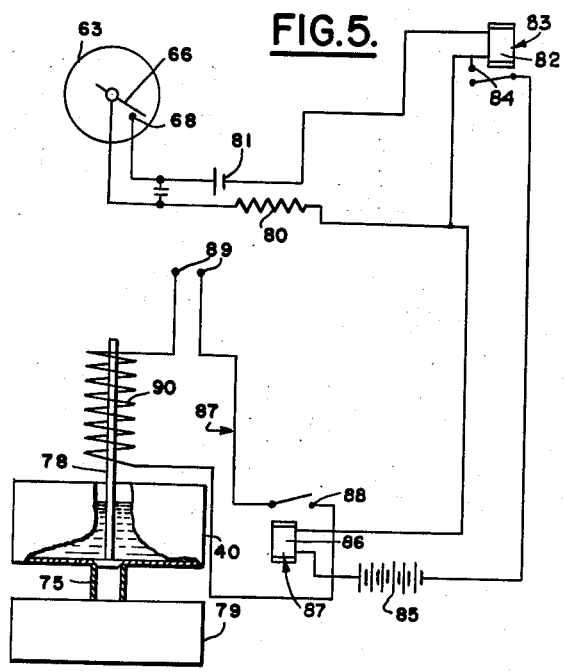
Fig. 5 is a diagram of the load control circuit.

The electrical circuit controlling the magnetic valve is illustrated in Fig. 5. The gage 63 is diagrammatically illustrated with the needle 66 and terminal contact 68. The pivot of the needle and the contact 68 are connected through a resistor 80 and battery 81 to a relay coil 82 of a sensitive relay unit 83. Contacts 84 are closed on energization of the coil, this occurring when gage needle 66 engages contact 68. Thereby a circuit is closed including contacts 84, battery 85 and relay coil 86 in the power relay 87; and contacts 88 of this relay are thereby closed. Thereupon, power from direct current source 89 passes through coil 90 magnetically actuating the core attached valve 78 to move to open position and liquid flows through the pipe line 75 to the receiving tank 79.

Power for the furnace is supplied from a direct current source 93 (Fig. 6). Terminal 94 is connected to the mid-point 95 of the resistance coil 32 which is incorporated in the furnace as overlying the refractory tube 33 in two sections as 32a and 32b. Section 32a is connected to the terminal 96 through a drum type resistor 97 having a slide contact 98, and a parallel control unit including a slide resistor 99 and a temperature control 100 of conventional construction such as a bimetallic thermostatic device. The thermostatic device is associated closely with the furnace chamber and operates to open a switch when the furnace temperature becomes excessive. Section 32b is connected to terminal 96 in parallel with section 32a, the circuit being through the parallel connected slide resistor 99 and temperature control 100. By this circuit the current to each coil section 32a and 32b may be varied either manually or, to a certain extent, automatically in accordance with furnace temperature.

The operation of the apparatus follows.

The test specimen 21 is supported in the furnace between adapters 18 and 20, and screw wheels 3 and 7 operated to prevent load application to the specimen. Electric power is then applied to the furnace and after heat equilibrium is established liquid is placed in the tank 40 to a load value at which calculation and prior experimentation has determined to be approximately correct for the test material. The gage is then adjusted in support slot 65 so that the gage rod 69 is in contact with the top end of "invar" rod 70, with sufficient pressure to rotate the gage dial needle against spring tension for at least one dial division (equivilent to 0.0001 inch) away from the terminal 68, against which it normally has bearing.

The supports to lever beams 43 and 44 are then released.

A creep elongation of the test material may now occur, moving the "invar" rod 70 down and then permitting the dial needle of the gage to move toward the terminal 68. On contact between needle and terminal the relay control system of the magnetic valve functions to open the valve and permit flow of liquid from the load tank to the overflow tank 79. This flow continues until, due to the decrease in load because of the flow, and to the normal elastic contraction of the test material, the rod 70 moves upwardly and the needle moves away from the terminal 68.

Successive creep increments of length of the test piece cause a repetition of the described cycle with repeated liquid additions to the overflow tank. As the load is depleted the creep impulses lessen in frequency until a stable state for the test temperature is reached. By weighing the overflow liquid and subtracting this weight from that of the initial load the proper initial load value may be obtained at which the test material may be held to a constant, no-creep length in use under predetermined temperature conditions.

Fig. 7 is illustrative of the creep impulse time sequence with diminution of stress with time. Two test materials are indicated, curve 110 showing relatively small creepage impulses over a longer time period and curve 111 showing larger creepage impulses over a shorter time. The material of curve 110 is a chromium-molybdenum-vanadium steel known in the trade as a. w. "Templex," and the material of curve 111 a tungsten-chromium-vanadium steel known in the trade as R. J. "Seminole." The curves of Fig. 7 illustrate the slowing down of the creepage impulses with time and the asymtotic approach to a constant dimensional value.

An auxiliary indicating apparatus is shown in Fig. 8. In this apparatus the gage 120 is interposed between the load tank and the lever 43. The gage has a pivot 121 to which a spring actuated needle 122 is attached for travel over dial face 123. A gear 124 is concentrically secured on the pivot and meshes with a rack 125 having a scribe 126 attached to its outer end. The scribe is supported so as to engage the surface of a revolvable cylinder 127 on which a graph sheet 128 is affixed. By rotating the cylinder at an appropriate speed during the test period a continuous record 129 of the stress variation in the test specimen is secured.

The apparatus as described affords a simple and highly accurate method for assuring creepage elimination in assembled structural units, particularly bolted units. The method excludes rigidity factors in creepage measurements insofar as these factors are characteristic of the structural parts separate from the bolts or other tie-in elements. For example, the inertia effect of gears, power screws, revolving nuts and elastic structural elements are eliminated.

Obviously many modifications and variations of the present invention are possible in the light of the above teachings. It is therefore to be understood that within the scope of the appended claims the invention may be practiced otherwise than as specifically described.

Having described the invention, what is claimed is:

1. In relaxation test apparatus for a test specimen of material, couplers for attachment to displaced points on said specimen, an anchor attachment for one of said couplers, a stress mechanism securable to the other of said couplers for applying stress to said specimen during a test period, control means for reducing the amount of said applied stress on elongation of said specimen due to said stress, and furnace means for maintaining the specimen at a selected elevated temperature during said test period, said stress mechanism including a receptacle adapted to receive a liquid to form a load, and said control means including an electromagnetically operated valve in the outlet pipe of said receptacle adapted to release liquid from said receptacle on elongation of said test specimen due to said load.

2. In relaxation test apparatus for a test specimen of material, couplers for attachment to displaced points on said specimen, an anchor attachment for one of said couplers, a stress mechanism securable to the other of said couplers for applying stress to said specimen during a test period, control means for reducing the amount of said applied stress on elongation of said specimen due to said stress, and furnace means for maintaining the specimen at a selected elevated temperature during said test period, said stress mechanism including a receptacle adapted to receive a liquid to form a load, and said control means including an electromagnetically operated valve in the outlet pipe of said receptacle adapted to release liquid from said receptacle automatically and periodically in time agreement with periodic extensions of the test specimen between the couplers.

3. In relaxation test apparatus for test specimens of rod material, couplers for attachment to the ends of said rod, an anchor attachment for one of said couplers, a furnace for maintaining said rod at a predetermined uniform temperature, a stress assembly unit for the other of said couplers, and a control unit for reducing the stress of said stress unit on occurrence of creepage impulses in said rod during the test period, said stress unit comprising a lever apparatus attached to said other coupler and a liquid receptacle having an outlet pipe attached to the power input point of said lever apparatus, and said control unit comprising an electromagnetic valve in said receptacle outlet pipe, a contact device, mechanical connections between the contact device and the stressed end of said test specimen and an electrical circuit including said contact device and said valve, energized on closure of said contacts to open said valve.

WILLIAM C. STEWART.

References Cited in the file of this patent

UNITED STATES PATENTS

| Number | Name | Date |
|---|---|---|
| 758,418 | Cock | Apr. 26, 1904 |
| 1,654,495 | Francke | Dec. 27, 1927 |
| 1,878,179 | Rawling | Sept. 20, 1932 |
| 1,888,755 | W. Barr et al. | Nov. 22, 1932 |
| 2,154,280 | Nadai et al. | Apr. 11, 1939 |
| 2,436,317 | Manjoine | Feb. 17, 1948 |
| 2,545,482 | Manjoine et al. | Mar. 20, 1951 |